United States Patent
Jung

(10) Patent No.: US 8,217,951 B2
(45) Date of Patent: Jul. 10, 2012

(54) GRAPHIC DATA PROCESSING APPARATUS AND METHOD

(75) Inventor: Chang Kwon Jung, Seoul-si (KR)

(73) Assignee: LG Electronics Inc., Seoul (KR)

( * ) Notice: Subject to any disclaimer, the term of this patent is extended or adjusted under 35 U.S.C. 154(b) by 894 days.

(21) Appl. No.: 12/052,488

(22) Filed: Mar. 20, 2008

(65) Prior Publication Data

US 2009/0027403 A1 Jan. 29, 2009

(30) Foreign Application Priority Data

Jul. 26, 2007 (KR) ................ 10-2007-0075273

(51) Int. Cl.
*G06F 15/80* (2006.01)
*G06F 15/16* (2006.01)
(52) U.S. Cl. ................ 345/505; 345/502
(58) Field of Classification Search ........... 345/502–505
See application file for complete search history.

(56) References Cited

U.S. PATENT DOCUMENTS

| | | | | |
|---|---|---|---|---|
| 5,774,668 A | * | 6/1998 | Choquier et al. | 709/223 |
| 6,618,042 B1 | * | 9/2003 | Powell | 345/204 |
| 2002/0026560 A1 | * | 2/2002 | Jordan et al. | 711/120 |
| 2006/0047751 A1 | * | 3/2006 | Chen et al. | 709/205 |
| 2006/0061578 A1 | | 3/2006 | Washizu | |
| 2006/0267993 A1 | * | 11/2006 | Hunkins et al. | 345/502 |
| 2007/0018990 A1 | * | 1/2007 | Shreiner | 345/505 |
| 2007/0294512 A1 | * | 12/2007 | Crutchfield et al. | 712/200 |
| 2008/0276261 A1 | * | 11/2008 | Munshi et al. | 719/328 |

FOREIGN PATENT DOCUMENTS

| | | |
|---|---|---|
| CN | 1330350 A | 1/2002 |
| CN | 1431629 A | 7/2003 |
| CN | 1753026 A | 3/2006 |

* cited by examiner

*Primary Examiner* — Xiao M. Wu
*Assistant Examiner* — Yingchun He
(74) *Attorney, Agent, or Firm* — Birch, Stewart, Kolasch & Birch, LLP

(57) ABSTRACT

The present invention relates to an apparatus and method for processing graphic data. According to an embodiment, the graphic data processing apparatus includes a CPU having at least one core; a GPU configured to process graphic data; a usage level checking unit configured to check a usage level of the CPU and/or a usage level of the GPU; and a control unit configured to compare the checked usage level of the CPU with a usage level reference of the CPU and/or to compare the checked usage level of the GPU with a usage level reference of the GPU, to allow the graphic data to be processed in parallel by the CPU and the GPU or only by the GPU according to the comparison results.

4 Claims, 6 Drawing Sheets

FIG.1B

62 — ○ GPU only
64 — ⊙ CPU (all cores) and GPU
66 — ○ CPU (one core only) and GPU

GRAPHIC DATA PROCESSING APPARATUS AND METHOD

This nonprovisional application claims the priority benefit of Korean Application No. 10-2007-0075273 filed on Jul. 26, 2007, the entirety of which are hereby incorporated by reference.

BACKGROUND OF THE INVENTION

1. Field of the Invention

The present invention relates to graphic data processing, and more particularly, to an apparatus and method for processing graphic data, wherein the usage levels of a graphics processing unit (GPU) and a central processing unit (CPU) are checked to allow graphic data to be processed either only by the GPU or in parallel by both the GPU and the CPU.

2. Description of the Related Art

Generally, a graphics card, which is also called a video card, a video display card, a video controller or the like, serves to convert digital information generated by a personal computer (PC) system into analog signals and to transmit the analog signals to a display unit.

Recently, as functions of a graphics card are extended from two-dimensional (2D) to three-dimensional (3D) graphic processing, the importance of the graphics card in the PC system is further increased.

However, the performance of the graphics card is determined in accordance with a graphics processing unit (hereinafter, referred to as a "GPU"). Therefore, if an amount of data to be processed by the GPU is large and the GPU is overloaded, the processing rate of the graphics card is reduced.

Accordingly, even though a PC system is capable of providing excellent performance, there is a problem in that if the processing is delayed due to the overloading of the GPU, the performance of the PC system may be degraded.

SUMMARY OF THE INVENTION

The present invention is conceived to address the aforementioned problems and limitations associated with the related art. Accordingly, an object of the present invention is to provide an apparatus and method for processing graphic data, wherein use rates (or usage) of a GPU and a CPU are checked to allow the graphic data to be processed only by the GPU or in parallel by the GPU and the CPU.

According to an aspect of the present invention, there is provided a graphic data processing apparatus, which comprises a dual core CPU; a GPU for processing graphic data; a processing amount check unit for checking processing amounts of the CPU and the GPU; and a control unit for comparing the checked processing amounts of the CPU and the GPU with reference processing amounts of the CPU and the GPU, respectively, to allow the graphic data to be processed in parallel by the CPU and the GPU or only by the GPU according to the result of the comparison.

The control unit may control processing the graphic data only by the GPU if it is determined from the comparison that the processing amount of the GPU is smaller (or not larger) than the reference processing amount of the GPU and/or the processing amount of the CPU is larger (or not smaller) than the reference processing amount of the CPU.

The control unit may control processing the graphic data in parallel by the GPU and the CPU if it is determined from the comparison that the processing amount of the GPU is larger than the reference processing amount of the GPU and/or the processing amount of the CPU is also smaller than the reference processing amount of the CPU.

The graphic data processing apparatus may further comprise a data dividing unit for receiving the graphic data from the control unit and dividing the received graphic data; and a data combining unit for combining, after the GPU and the CPU have processed the divided graphic data, the processed graphic data to display the combined graphic data on a display unit such as a monitor.

The control unit may transfer the graphic data processed by the CPU to the data combining unit.

The graphic data processing apparatus may further comprise a user selection unit for allowing a user to manually select whether to process the graphic data only by the GPU or in parallel by the GPU and the CPU.

The control unit may control one of the cores of the dual core CPU to process system data and another core to be assigned to the GPU for processing the graphic data, in accordance with the processing amounts (e.g., usage levels) of the GPU and the CPU provided by the processing amount check unit.

The processing amounts may be use rates for processing the graphic data or system data.

According to another aspect of the present invention, there is provided a method of processing graphic data, which comprises the steps of applying a command for processing graphic data; checking processing amounts of a GPU and a CPU in response to the applied command; comparing the checked processing amounts of the GPU and the CPU with reference processing amounts of the GPU and the CPU, respectively; and controlling the graphic data to be processed in parallel by the GPU and the CPU or only by the GPU according to the result of the comparison.

The controlling step may comprise the step of allowing the graphic data to be processed only by the GPU, if it is determined in the comparison that the processing amount of the GPU is smaller than the reference processing amount of the GPU and/or the processing amount of the CPU is larger than the reference processing amount of the CPU.

The controlling step may comprise the step of allowing the graphic data to be processed in parallel by the GPU and the CPU, if it is determined in the comparison that the processing amount of the GPU is larger than the reference processing amount of the GPU and/or the processing amount of the CPU is smaller than the reference processing amount of the CPU.

The controlling step may comprise the steps of assigning one of cores of the CPU to process the graphic data; dividing the graphic data to allow the divided graphic data to be processed in parallel by the assigned core and the GPU; and combining the divided graphic data to allow the combined graphic data to be displayed as a frame on a monitor.

The dividing step may comprise the step of dividing graphic data according to split areas on an entire screen of the monitor.

The combining step may comprise the step of allowing the graphic data processed by the assigned core to be transferred through the control unit and the graphic data processed by the GPU to be transferred through the GPU, respectively, in synchronization with each other.

According to the present invention, there is an advantage in that use rates of the GPU and the CPU are checked to allow graphic data to be processed only by the GPU or in parallel by the GPU and the CPU according to the checked use rates.

According to an embodiment, the present invention provides a graphic data processing apparatus, comprising: a CPU having at least one core; a GPU configured to process graphic data; a usage level checking unit configured to check a usage level of the CPU and/or a usage level of the GPU; and a control unit configured to compare the checked usage level of the CPU with a usage level reference of the CPU and/or to compare the checked usage level of the GPU with a usage level reference of the GPU, to allow the graphic data to be processed in parallel by the CPU and the GPU or only by the GPU according to the comparison results.

According to an embodiment, the present invention provides a data processing apparatus, comprising: a dual core CPU; a GPU configured to process graphic data; a usage level checking unit configured to check a usage level of the CPU and a usage level of the GPU; and a control unit configured to control one core of the dual core CPU to process system data and another core of the dual core CPU to be assigned to the GPU for processing the graphic data, in accordance with the checked usage levels of the GPU and the CPU provided by the usage level checking unit.

According to an embodiment, the present invention provides a method of processing graphic data, comprising: applying a command for processing graphic data; checking a usage level of a GPU and/or a usage level of a CPU in response to the applied command; comparing the checked usage level of the GPU with a usage level reference of the GPU and/or the checked usage level of the CPU with a usage level reference of the CPU; and controlling at least one of the GPU and the CPU to allow the graphic data to be processed in parallel by the GPU and the CPU or only by the GPU according to the comparison results.

According to another embodiment, the present invention provides a method of processing graphic data, comprising: applying a command for processing graphic data; checking a usage level of a GPU and/or a usage level of a CPU in response to the applied command; comparing the checked usage level of the GPU with a usage level reference of the GPU and/or the checked usage level of the CPU with a usage level reference of the CPU; assigning one of cores of the CPU to process the graphic data based on the comparison results; dividing the graphic data to allow the divided graphic data to be processed in parallel by the assigned core of the CPU and the GPU; and combining the divided graphic data to allow the combined graphic data to be displayed on a display unit.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will become apparent from the following descriptions of preferred embodiments given in conjunction with the accompanying drawings, in which:

FIG. 1B is an example of a menu displayable for a user's selection of a use of a GPU and/or a CPU according to an embodiment of the present invention;

DESCRIPTION OF THE PREFERRED EMBODIMENTS

Hereinafter, a graphic data processing apparatus according to the preferred embodiments of the present invention will be described in detail with reference to the accompanying drawings.

Figure 1A:
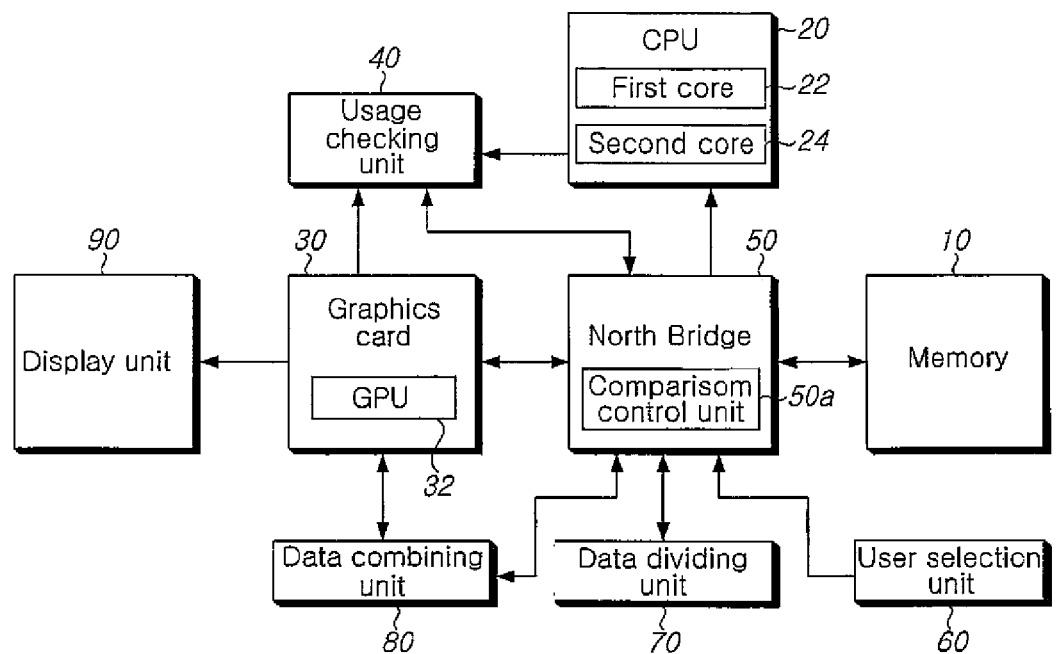
FIG. 1A is a view showing an example of the configuration of a graphic data processing apparatus according to a preferred embodiment of the present invention.

Referring to FIG. 1A, the graphic data processing apparatus according to an embodiment comprises a central processing unit (CPU) 20 configured to access a memory 10 (or other storage unit) to execute a variety of application programs and to apply a command for processing graphic data relevant to the application programs. The CPU 20 is preferably a dual core CPU including a first core 22 and a second core 24, but can of other type. As an example, one of the first and second cores 22 and 24 processes system data, while the other of the first and second cores 22 and 24 processes graphic data under the control of a North Bridge 50 that will be described below. Here, the second core 24 may be assigned to process graphic data.

The graphic data processing apparatus further comprises a graphics card 30 for receiving the graphic data through the North Bridge 50 in accordance with the command applied by the CPU 20 and converting the graphic data into image signals to display the graphic data on a display unit 90.

The graphics card 30 is provided with a graphics processing unit (GPU) 32 for processing the received graphic data. As an alternative, the GPU 32 can be part of the North Bridge 50 on a single chip.

In addition, the graphic data processing apparatus further comprises a usage checking unit 40 (or processing amount checking unit) for checking the resource use rates (i.e., the usage levels) of the CPU 20 and the GPU 32. The usage levels of the CPU 20 and the GPU 32 represent how much or what percentage of the CPU 20 and GPU 32 has been used or involved in processing data, and may also be referred to herein as "processing amounts" of the CPU 20 and the GPU 32. Here, it is preferred that a real time assessment of the usage levels of the CPU 20 and GPU 32 is made by the usage checking unit 40 and such assessment may be performed at regular intervals, continuously or at a desired time. As an example, the usage checking unit 40 can be a task manager of Windows provided by Microsoft Corporation and a driver corresponding to the graphics card 30. The usage of the CPU 20 and/or GPU 32 may be measured or determined by measuring an idle tread value of the CPU 20 and/or GPU 32 for a predetermined period of time or by detecting the CPU/GPU usage from the registry information of the computer system.

The graphic data processing apparatus further comprises the North Bridge 50 which includes a comparison control unit 50a for comparing, if the usage levels of the GPU 32 and the CPU 20 checked by the usage checking unit 40 are provided, the provided usage levels of the GPU 32 and the CPU 20 with a predetermined usage level reference of the GPU 32 (hereinafter also referred to as a "first reference") and a predetermined usage level reference of the CPU 20 (hereinafter also referred to as a "second reference"), respectively. According to a preferred embodiment, if the comparison control unit 50a determined that the provided usage level of the GPU 32 is smaller than (or not larger than) the first reference and the provided usage level of the CPU 20 is larger than (or not smaller than) the second reference, the comparison control unit 50a controls the GPU 32 so that the graphic data are processed only by the GPU 32. On the contrary, if it is determined that the provided usage level of the GPU 32 is larger than the first reference amount and the provided processing amount of the CPU 20 is smaller than the second reference, the comparison control unit 50a controls so that the graphic data are processed in parallel by both the second core 24 and the GPU 32.

That is, the comparison control unit 50a assigns the second core 24 of the CPU 20 to perform a function of the GPU, and thus, the graphic data are processed in parallel by the second core 24 and the GPU 32. The comparison control unit 50a can be part of the North Bridge 50 or can reside in other components of the system.

In addition, when the second core 24 and the GPU 32 are to process the graphic data in parallel under the control of the comparison control unit 50a, the comparison control unit 50a (or the North Bridge 50) transfers the graphic data to be processed to a data dividing unit 70 (hereinafter, referred to as a "dividing unit") which in turn can divide the graphic data and forward the divided graphic data respectively to the second core 24 and the GPU 32 for processing. In addition, the North Bridge 50 (or the comparison control unit 50a) transfers the graphic data processed by the second core 24 and/or the graphic data processed by the GPU 32 to a data combining unit 80 (hereinafter, referred to as a "combining unit") so that they may be combined as desired.

For example, once the graphic data to be processed are received through the North Bridge 50, the dividing unit 70 divides the received graphic data. For instance, the graphic data are divided to partition each frame into two predetermined areas such that the graphic data contained in the partitioned areas can be processed in parallel respectively by the second core 24 and the GPU 32.

If the graphic data processed respectively by the second core 24 and the GPU 32 are transferred, the combining unit 80 combines the transferred graphic data.

The North Bridge 50, the combining unit 80 and the dividing unit 70 can be integrated into one component. Further, all the components of the graphic data processing apparatus are operatively coupled and configured.

In addition, the graphic data processing apparatus further comprises a user selection unit 60 for allowing a user to manually select whether to process the graphic data only by the GPU 32 or in parallel by both the second core 24 and the GPU 32. For example, the user selection unit 60 provides a graphical display menu on the display unit 90, which can be implemented by a user selection program installed in the user selection unit 60, so that the user can make a selection of desired processor. Buttons, keys, etc. can also be provided to such user's manual selection. For instance, as shown in FIG. 1B, a menu provides three different choices or modes (62, 64, 66) for a user, wherein the first choice 62 is for allowing only the GPU to process the data, the second choice 64 is for allowing both the CPU (all cores such as first and second cores, etc. of the CPU) and the GPU to process the data, and the third choice 66 is for allowing certain cores of the CPU (e.g., only one core such as the second core 24 of the CPU) and the GPU to process the data. Other examples are possible. As an alternative, it is automatically determined whether the graphic data are processed only by the GPU 32 or in parallel by the GPU 32 and the CPU 20 depending on the determined current usage levels of the GPU 32 and the CPU 20.

Hereinafter, a method of processing graphic data according to a preferred embodiment of the present invention will be described in detail with reference to FIGS. 2 and 3. This method is implemented in the apparatus of FIG. 1 but can be implemented in other suitable system.

Figure 2:
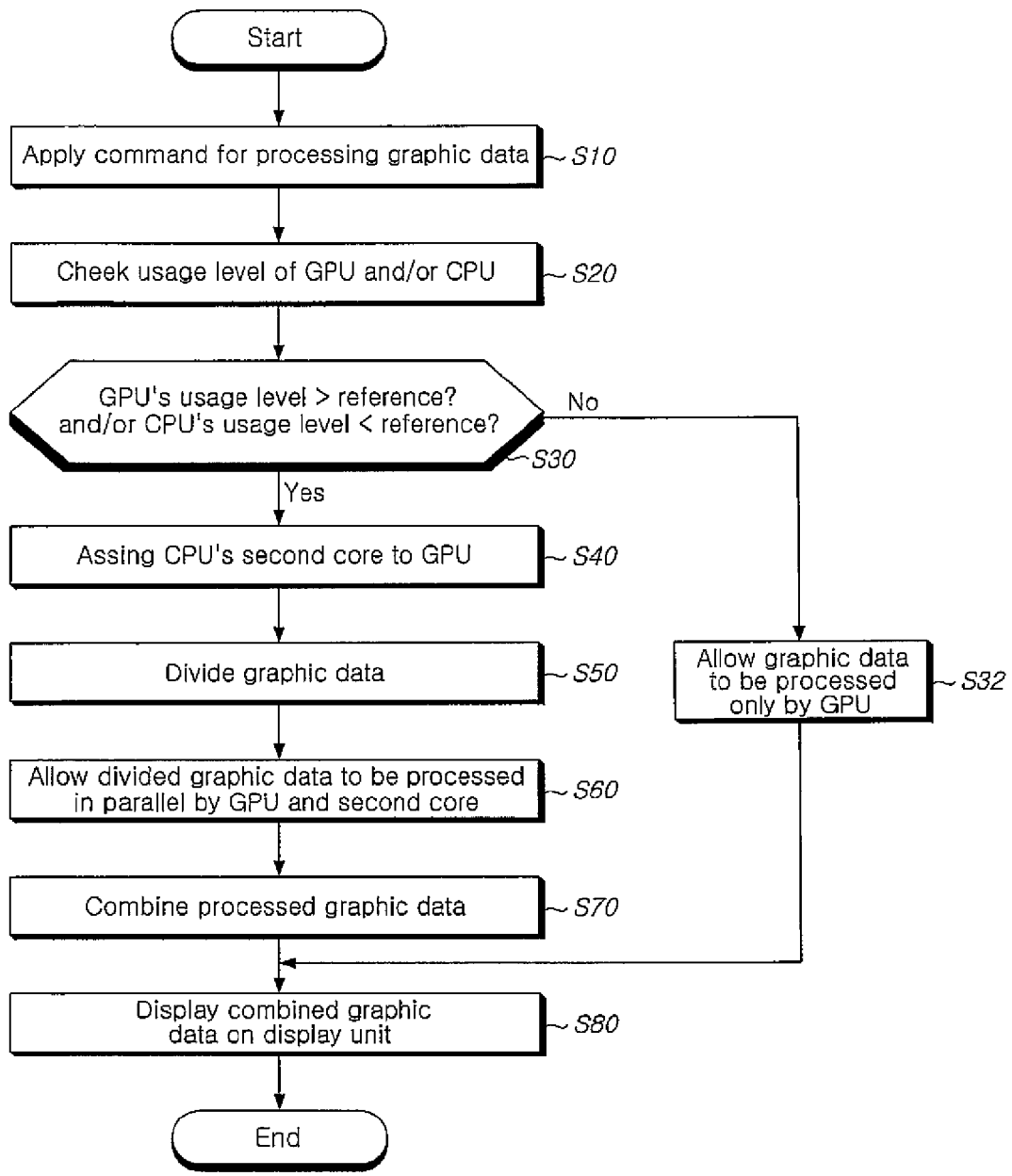
FIG. 2 is a flowchart illustrating a graphic data processing method according to a preferred embodiment of the present invention.

First, referring to FIG. 2, the CPU 20 accesses the memory 10 to perform a specific operating process in accordance with an application program execution command and provides the North Bridge 50 with a graphic data processing command corresponding to the operating process (step S10).

Then, the comparison control unit 50a transfers the graphic data to the graphics card 30.

If the graphic data are transferred to the graphics card 30, the usage level checking unit 40 checks processing amounts (usage levels) of the GPU 32 and the CPU 20 that are currently being driven and continuously sends the checked usage levels of the GPU 32 and the CPU 20 to the comparison control unit 50a (step S20). For instance, how much (e.g., what percentage) of the total processing capacity of the GPU 32 and the CPU 20 is currently being used can be determined by the usage checking unit 40.

Accordingly, the comparison control unit 50a compares the checked usage levels of the GPU 32 and the CPU 20 with a predetermined first usage level reference and a second usage level reference, respectively (step S30). In one embodiment, at step S30 if it is determined that the GPU's current usage level is greater than the first usage level reference and that the CPU's current usage level is less than the second usage level reference, then the method proceeds to step S40 or otherwise to step S32. In another embodiment, at step S30 if it is determined either that the GPU's current usage level is greater than the first usage level reference or that the CPU's current usage level is less than the second usage level reference, then the method can proceed to step S40. If not, the method proceeds to step S32.

Here, the predetermined usage level references may be set by a user or arbitrarily set to default values. Further, one or more reference values may be used to compare with each of the current usage levels of the GPU 32 and the CPU 20. For instance, two values (50% and 75%) can be used as references. In such an example, if the GPU 32's current usage level is at or above 75%, then the method may proceed to step S40. If the GPU's current usage level is between 50% and 75%, then the current mode of the system is maintained (the mode is not switched to a different mode). If the GPU's current usage level is below 50%, then the method may proceed to step S32.

If it is determined in step S30 that the usage level of the GPU 32 is larger than the first reference and (in another example, "or") the usage level of the CPU 20 is also smaller than the second reference, the comparison control unit 50a assigns the second core 24 to perform a function of the GPU (step S40). At this time, since the comparison control unit 50a assigns the second core 24 to perform a function of the GPU, the first core 22 of the CPU 20 processes system data, and the second core 24 and the GPU 32 process the graphic data in parallel.

Then, since the second core 24 is assigned to process the graphic data, the comparison control unit 50a transfers the graphic data to the dividing unit 70.

If the graphic data are transferred by the comparison control unit 50a, the dividing unit 70 divides the graphic data into parts to be processed respectively by the second core 24 and the GPU 32 (step S50). Here, the graphic data are divided in order to partition each frame into two predetermined areas such that the graphic data contained in the partitioned areas can be processed by the second core 24 and the GPU 32, respectively.

Figure 3A:
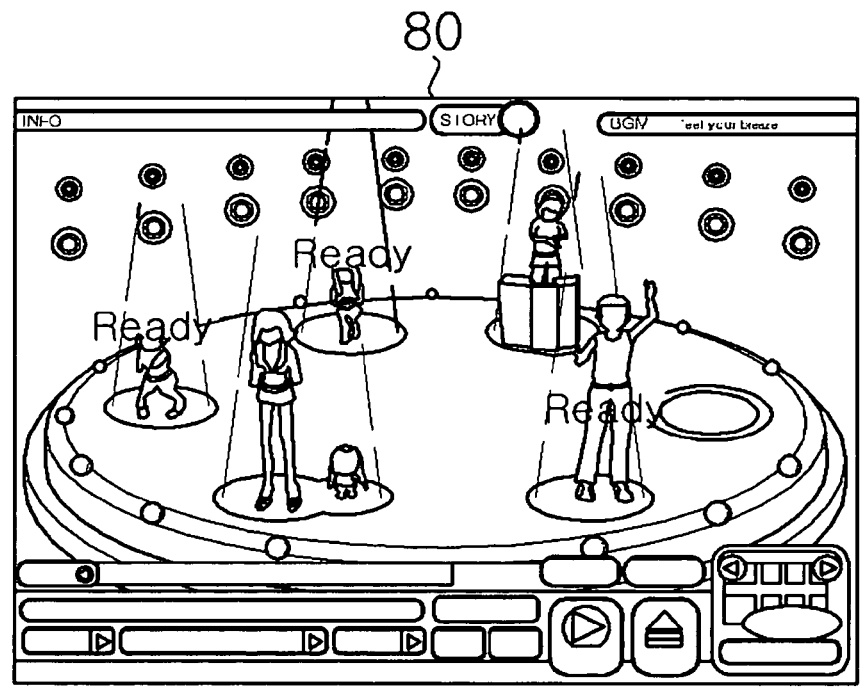
FIGS. 3A to 3C are views showing an example in which a screen is split to divide graphic data to be processed into certain areas according to an embodiment of the present invention.
Figure 3B:
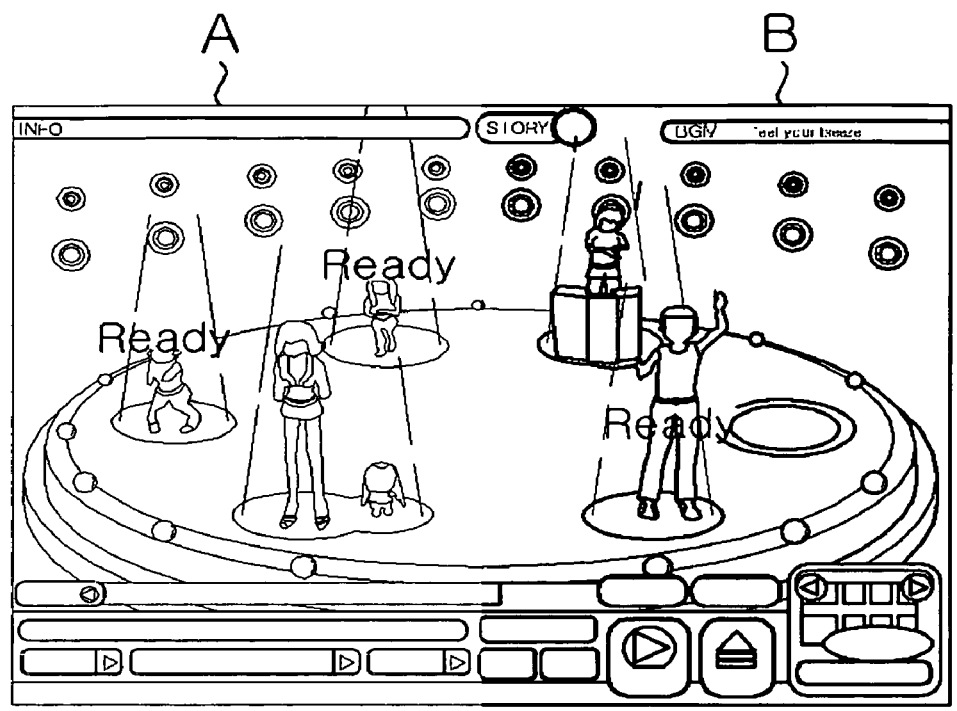
Figure 3C:
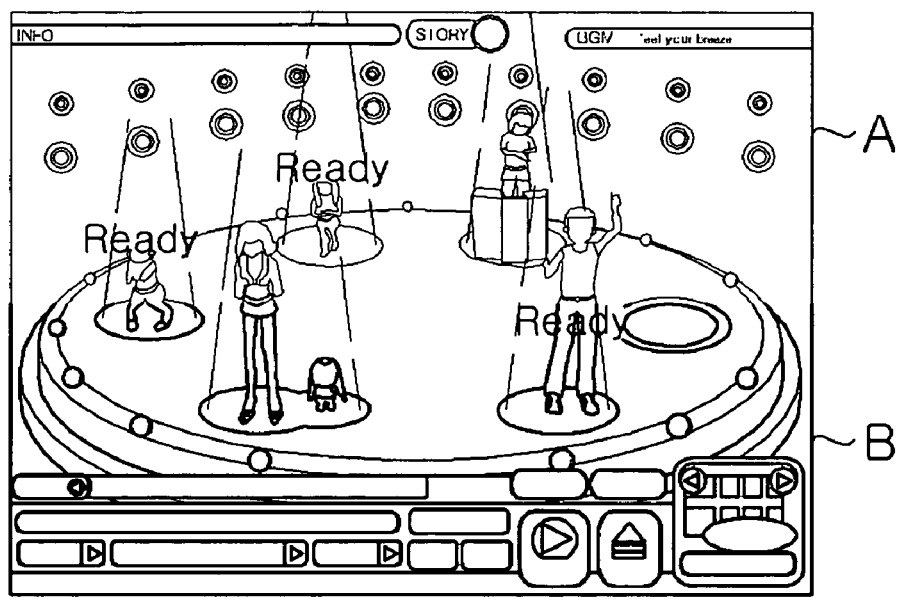

For example, FIGS. 3A to 3C are views illustrating an example of a screen divided into two partitions for processing graphic data. Referring to FIG. 3A to 3C, the dividing unit 70 divides the graphic data such that the entire screen (FIG. 3A) of the display unit 90 can be split into two areas in a horizontal direction (FIG. 3B) or vertical direction (FIG. 3C). The graphic data are divided in such a manner that graphic data in an area A of the split areas are processed by the second core 24 and graphic data in an area B of the split areas are processed by the GPU 32. This method is the same as the split frame rendering (SFR) among the methods of rendering a screen in the scalable link interface (SLI) of Gforce.

Returning to FIG. 2, the graphic data divided by the dividing unit 70 in step S50 are transferred to the second core 24 and the GPU 32, respectively, through the comparison control unit 50a or the North Bridge 50.

Then, the second core 24 and the GPU 32 respectively process the transferred divided graphic data in parallel (step S60).

The graphic data processed by the second core 24 are transferred to the combining unit 80 through the comparison control unit 50a (or the North Bridge 50), and the graphic data processed by the GPU 32 are transferred to the combining unit 80 through the GPU 32. At this time, the second core 24 and the GPU 32 output the graphic data in synchronization with each other.

The combining unit 80 that has received the outputted graphic data combines the graphic data such that the combined graphic data can be displayed as a full screen on the display unit 90 (step S70). If the graphics card has a bandwidth of a 16x speed slot, the combining unit 80 receives graphic data through a bandwidth of an 8x speed slot and then combines the received graphic data.

The combined graphic data are displayed on the display unit 90 through the graphics card 30 (step S80).

On the other hand, if it is determined in step S30 that the current usage level of the GPU 32 is not larger than the first usage level reference and/or the current usage level of the CPU 20 is not smaller than the second usage level reference, the comparison control unit 50a controls so that the graphic data are processed only by the GPU 32 (step S32).

According to an embodiment, in the example of FIG. 1A, the user can select an appropriate mode according the amount of processing needs. Various modes can be available to the user. For instance, the mode 64 may be a graphics mode for movies, games, etc. Further, while the GPU and/or CPU is running, the comparison control unit 50a can receive current battery information (e.g., from OS) and automatically switch to an appropriate mode (e.g., one of the modes 62, 64, 66) depending on the battery information. In this manner, the system is able to check the current battery level and override the user-selected mode (62, 64 or 66) if needed. For instance, if the user selected the mode 66 and the current battery level is detected to be below 50%, then the system may switch the mode to the mode 62. Other variations are possible. For example, two or more thresholds can be used to switch between the modes 62, 64 and 66. Also anytime the mode switch is made due to the user's selection or system's selection, the user may be notified of the mode switch and/or the new mode of the system. Such notification can be made visually and/or audibly through the apparatus of FIG. 1A.

The present invention described in the aforementioned embodiments is advantageous in that since use rates of the GPU and the CPU are checked to allow graphic data to be processed only by the GPU or in parallel by the GPU and the CPU or parts thereof, the GPU is not overloaded.

According to a graphic data processing apparatus and method of the present invention as described above, there still is an advantage in that use rates of the GPU and the CPU are checked to allow graphic data to be processed only by the GPU or in parallel by the GPU and the CPU (or parts thereof) depending on the checked use rates.

Further, if the GPU and the CPU are allowed to process graphic data in parallel, the performance of two graphics cards is improved and thus, the cost and volume reduction can be made.

While the present invention has been illustrated and described in connection with the accompanying drawings and the preferred embodiments, the present invention is not limited thereto and is defined by the appended claims. Therefore, it will be understood by those skilled in the art that various modifications and changes can be made thereto without departing from the spirit and scope of the invention defined by the appended claims.

What is claimed is:

1. A graphic data processing apparatus, comprising:
   a CPU having at least two cores;
   a GPU configured to process graphic data;
   a usage level checking unit configured to check a usage level of the CPU and a usage level of the GPU;
   a control unit configured to compare the checked usage level of the CPU with a usage level reference of the CPU and to compare the checked usage level of the GPU with a usage level reference of the GPU, and to control one core of the CPU to process system data and another core of the CPU to be assigned to the GPU for processing the graphic data in accordance with the checked usage levels of the GPU and the CPU provided by the usage level checking unit,
   wherein the control unit allows processing of the graphic data only by the GPU if the control unit determines that the checked usage level of the GPU is not larger than the usage level reference of the GPU and/or the checked usage level of the CPU is not smaller than the usage level reference of the CPU, and
   wherein the control unit allows processing of the graphic data in parallel by the GPU and the assigned core of the CPU if the control units determines that the checked usage level of the GPU is larger than the usage level reference of the GPU and, at the same time, the checked usage level of the CPU is smaller than the usage level reference of the CPU;
   a data dividing unit configured to receive the graphic data from the control unit and to divide the received graphic data when the control unit allows processing of the graphic data in parallel by the GPU and the assigned core of the CPU;
   a data combining unit configured to combine, after the GPU and the assigned core of the CPU have respectively processed the divided graphic data by the data dividing unit, the processed graphic data to display the combined graphic data on a display unit; and
   a user selection unit configured to allow a user to manually select whether to process the graphic data only by the GPU or in parallel by the GPU and the assigned core of the CPU,
   wherein the manual selection of the user made through the user selection unit is overridden by the control unit based on current battery information associated with the apparatus.

2. The apparatus as claimed in claim 1, wherein the control unit transfers the graphic data processed by the assigned core of the CPU to the data combining unit.

3. The apparatus as claimed in claim 1, wherein the usage levels are use rates for processing the graphic data or system data.

4. A method of processing graphic data, comprising:

applying a command for processing graphic data;

checking a usage level of a GPU and a usage level of a CPU in response to the applied command, the CPU having at least two cores;

comparing the checked usage level of the GPU with a usage level reference of the GPU and the checked usage level of the CPU with a usage level reference of the CPU to develop a comparison result;

controlling at least one of the GPU and one core of the CPU to allow the graphic data to be processed in parallel by the GPU and the one core of the CPU or only by the GPU according to the comparison results, wherein the controlling step allows the graphic data to be processed only by the GPU if it is determined that the checked usage level of the GPU is not larger than the usage level reference of the GPU and/or the checked usage level of the CPU is not smaller than the usage level reference of the CPU, wherein the controlling step allows the graphic data to be processed in parallel by the GPU and the one core of the CPU if it is determined that the checked usage level of the GPU is larger than the usage level reference of the GPU and, at the same time, the checked usage level of the CPU is smaller than the usage level reference of the CPU;

assigning the one core of the CPU to process the graphic data based on the comparison result;

dividing the graphic data to allow the divided graphic data to be processed in parallel by the assigned core of the CPU and the GPU;

combining the divided graphic data to allow the combined graphic data to be displayed on a display unit;

receiving a user's manual selection on whether to process the graphic data only by the GPU or in parallel by the GPU and the CPU; and controlling at least one of the GPU and the CPU based on the user's manual selection, wherein the user's manual selection is overridden based on current battery information.

* * * * *